(12) United States Patent
Buhler et al.

(10) Patent No.: US 8,271,791 B2
(45) Date of Patent: Sep. 18, 2012

(54) LONG-TERM SECURE DIGITAL SIGNATURES

(75) Inventors: Peter Buhler, Horgen (CH); Klaus Kursawe, Leuven (BE); Roman Maeder, Zurich (CH); Michael Osborne, Au (CH)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 12/128,019

(22) Filed: May 28, 2008

(65) Prior Publication Data

US 2009/0327732 A1 Dec. 31, 2009

Related U.S. Application Data

(63) Continuation of application No. 10/548,137, filed as application No. PCT/IB2004/000626 on Mar. 3, 2004, now abandoned.

(30) Foreign Application Priority Data

Sep. 16, 2004 (WO) .................. WO2004/079986

(51) Int. Cl.
*G06F 21/00* (2006.01)
(52) U.S. Cl. ........ 713/176; 713/155; 713/159; 713/178; 705/75; 706/26; 706/30
(58) Field of Classification Search .................. 713/155, 713/159, 176, 178; 705/75; 726/26, 30
See application file for complete search history.

(56) References Cited

U.S. PATENT DOCUMENTS

| | | | | |
|---|---|---|---|---|
| 5,297,206 A * | 3/1994 | Orton | | 380/30 |
| 6,209,091 B1 * | 3/2001 | Sudia et al. | | 713/175 |
| 6,367,013 B1 * | 4/2002 | Bisbee et al. | | 713/178 |
| 6,408,388 B1 * | 6/2002 | Fischer | | 713/176 |
| 6,411,716 B1 * | 6/2002 | Brickell | | 380/286 |
| 6,499,105 B1 * | 12/2002 | Yoshiura et al. | | 713/176 |
| 6,584,565 B1 * | 6/2003 | Zamek | | 713/156 |
| 6,785,815 B1 * | 8/2004 | Serret-Avila et al. | | 713/176 |
| 6,898,709 B1 * | 5/2005 | Teppler | | 713/178 |
| 7,194,620 B1 * | 3/2007 | Hayes | | 713/157 |
| 7,269,730 B2 * | 9/2007 | Stirbu | | 713/169 |
| 7,814,327 B2 * | 10/2010 | Ahuja et al. | | 713/177 |
| 2002/0090085 A1 * | 7/2002 | Vanstone et al. | | 380/44 |
| 2002/0152385 A1 * | 10/2002 | Vanstone et al. | | 713/176 |
| 2002/0184217 A1 * | 12/2002 | Bisbee et al. | | 707/9 |
| 2004/0111625 A1 * | 6/2004 | Duffy et al. | | 713/186 |
| 2005/0201561 A1 * | 9/2005 | Komano et al. | | 380/255 |
| 2007/0294537 A1 * | 12/2007 | Peyravian et al. | | 713/178 |

OTHER PUBLICATIONS

John Lowry, "Location-Independent Information Object Security," IEEE, Apr. 1995, pp. 54-62.
Istvan Zsolt Berta and Zoltan Adam Mann, "Implementing Elliptic Curve Cryptography on PC and Smart Card," Department of Communications, Budapest University of Technology and Economics, Hungary, Sep. 22, 2002, pp. 1-27.

* cited by examiner

*Primary Examiner* — Nathan Flynn
*Assistant Examiner* — Sarah Su
(74) *Attorney, Agent, or Firm* — Michael J. Buchenhorner; Vazken Alexanian

(57) ABSTRACT

A method for digitally signing of electronic documents which are to be kept secure for a very long time, thereby taking into account future cryptographic developments which could render currently cryptographic key-lengths insufficient. A double signature is issued for each document. A first digital signature ensures the long term security, while a second digital signature ensures the involvement of an individual user. Thereby, the second digital signature is less computationally intensive in its generation than the first digital signature.

9 Claims, 3 Drawing Sheets

LONG-TERM SECURE DIGITAL SIGNATURES

This application is a continuation of U.S. application Ser. No. 10/548,137, filed on Aug. 13, 2006 now abandoned, which is a National Stage Entry of PCT/IB04/00626, filed on Mar. 3, 2004, of which the benefit of the priority filing date is claimed and which is hereby incorporated by reference in its entirety.

TECHNICAL FIELD

The present invention is related to a method, computer device, and system for digitally signing an electronic document that is to be kept secure for a long time period. The invention also relates to a method for verifying an electronic document that has been digitally signed.

BACKGROUND OF THE INVENTION

More and more documents are stored electronically. This often involves a digital time-stamping mechanism in order to bind the document or its content to a particular point in time. To minimize the risk that either the data or the time-stamp can be tampered with at a later date a cryptographic digital signature is used to protect both elements.

US Patent Application Publication US 2002/0120851 A1 refers to a device and method for data time-stamping. The device includes a trusted clock, a memory, a time-stamper and a digital signer. The device is adapted to store to the memory data that has been time-stamped by the time-stamper, with a time obtained from the trusted clock, and digitally signed with a digital signature by the digital signer.

However, at present the requirement that a user is legally liable for documents that he/she digitally signs and that the documents remain secure for a long period of time, for example at least 30 years, can not be fulfilled, because of the limited computational power of personal cryptographic tokens.

It should not be possible to create any signature without the users consent. This can be forced by an individual cryptographic hardware token which acts as a signing device (e.g. a smart card).

Current hardware tokens of this type are restricted in terms of computational power which means that digital signatures with very large key lengths cannot be computed within an acceptable time.

It is an object of the present invention to create and verify digital signatures that are secure for a very long time, taking into account future cryptographic developments which could render current cryptographic key-lengths insufficient.

SUMMARY AND ADVANTAGES OF THE INVENTION

In accordance with the present invention, there is provided a method for digitally signing an electronic document for long term security purposes comprising the steps of marking with a digital mark and signing with a first digital signature the electronic document. The marked and signed electronic document is then signed with a second digital signature that is less computationally intensive in its generation than the first digital signature. In most cases the second digital signature is based on a shorter cryptographic key then the first digital signature.

The electronic document and the first digital signature or part thereof can be provided to a client computer where under use of a cryptographic token the second digital signature which depends on the content of the electronic document and the first digital signature or the part thereof is generated. This allows a presenting or displaying of the electronic document to a user, who can review the electronic document and sign it with an individual cryptographic token, for example with a smart card, which belongs to the user and is also referred to as signing device.

The cryptographic token can be related to a user group which then shares one cryptographic token making the group or a department liable.

The digital mark can comprise a unique number that is a sequence number, a time-stamp, or a value derived thereof. The digital mark allows a unique number to be allocated which later on can be used for revocation purposes.

The signed electronic document can additionally be signed with a third digital signature or a further digital mark, i.e. after the user has signed. This would be performed where the first digital signature was created, e.g. at a time-stamping or signature server. The revocation process could be simplified because it would allow an easier key revocation, as it is sufficient to tell the signature server which keys are invalid.

The digital signatures may use asymmetrical as well as symmetric encryption. Public/secret-key cryptography can be applied advantageously by using first and second signature keys. The individual key for the second signature has a length that can be handled by the individual signing devices. However this might be insufficient to guarantee security for the long-term future. The first signature key on the other hand is of sufficient length such that by all reasonable predictions it can not be broken within the desired live-time of the key.

In general, the invention solves the problem of creating digital signatures that must be secure for a very long time, taking into account future cryptographic developments which could render current cryptographic key-lengths insufficient. Having a digital signature or part thereof calculated on an easy transportable device, such as a smart card, makes a user legally liable for documents that he/she digitally signs. In accordance with the invention a double signature is issued for each document, one ensuring the long time security, the other one ensuring the involvement of the individual user. The final signature of the document is therefore a combination of these two signatures. Taking into account the nature of the two signatures in terms of used key size and of the calculation algorithms, it seems not to be useful to regenerate the signatures during the life of a document. The combination of these two signatures allows a very high security level, for short term and overall for long term.

The first stage involves a trusted digital marking which may add time and date and certificate information to the document or a document hash value, and signing it with the first digital signature.

This first stage can be performed by a trusted server that uses a very strong key length, e.g. 3072-4096 bits, and may use several different signature schemes in parallel, e.g. RSA, ECC, to maintain security even if a particular scheme is compromised.

The user then verifies the document, which now includes the signed digital mark, and signs it again using his/her individual signing device with the second digital signature digital which is less computationally intensive in its generation than the first digital signature. The document is then contemplated as a validly signed electronic document. An advantage of this is the long term security, while still allowing every individual user to have his/her private key that never leaves the individual signing device. This allows that users be liable for their signatures, while giving assurance that the key-length on the final signature is sufficient to last for a long time. Thus, the scheme allows a long-term personal liability on digital signatures.

It is also possible to revoke a key if one individual signing device gets lost. Because every signature comes with a reliable digital mark, signatures signed after the revocation time of one individual signing device are simply declared invalid.

If—due to technical developments—the key length of the individual signing keys are in danger of being insufficient, all individual signing keys are revoked and replaced by longer keys. To increase security, the digital marking key may be destroyed, such that it is impossible to issue any digital mark compatible with the old keys.

A computer device, e.g. a laptop computer, with an electronic smart card reader for reading a smart card can be used to generate the second digital signature. Also possible is to use a personal digital assistant (PDA) which at the same time can be the cryptographic token. The cryptographic token is contemplated as an individual signing device or part thereof which is a small device in the possession of the user that issues the second digital signature.

In another aspect of the invention there is provided a system for digitally signing an electronic document for long term security purposes. The system comprises a document repository for storing and providing the electronic document, a digital signature computing device connected to the document repository for deriving from a digital mark and the electronic document a first digital signature, and a cryptographic device for generating a second digital signature that is less computationally intensive in its generation than the first digital signature.

The digital signature computing device could comprise a tamperproof clock, which can be used to create the digital mark and therewith the first digital signature. In addition, the digital signature computing device could comprise an internal clock for verifying a predefined time-interval between the issuance of the first digital signature and the second digital signature to be issued. For example, the individual digital signature computing device only issues the second digital signature on the electronic document that was digitally marked and signed within the last, for example, ten minutes. This makes it harder to stage long term attacks that try to gather the components of a valid digital signature over a certain time period.

The digitally signed electronic document can be verified under use of a first public key corresponding to the first digital signature and a second public key corresponding to the second digital signature. The use of public-key cryptography allows an easy verification process.

In yet another aspect of the invention there is provided a method for verifying an electronic document that has been digitally signed by a first digital signature under use of a digital mark and thereon with a second digital signature. The method comprises the step of verifying the validity of the digitally signed electronic document by using a first public key corresponding to the first digital signature and a second public key corresponding to the second digital signature that is less computationally intensive in its generation than the first digital signature.

DESCRIPTION OF THE DRAWINGS

Preferred embodiments of the invention are described in detail below, by way of example only, with reference to the following schematic drawings.

DETAILED DESCRIPTION OF THE INVENTION

In the following, the various exemplary embodiments of the invention are described.

Figure 1:
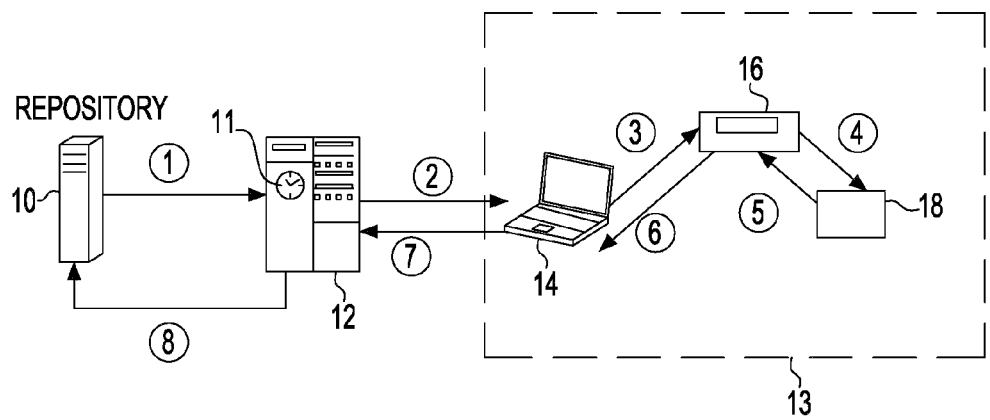
FIG. 1 shows a schematic illustration of components in accordance with the present invention.

FIG. 1 shows a schematic illustration of units within a system for digitally signing and verifying an electronic document that is to be kept secure for many years. A document repository 10, which can be a database server, stores electronic documents. The document repository 10 is connected to a digital signature computing device 12 that is contemplated as a digital signature server or time-stamping server, hereafter also referred to as signature server 12. This server is regarded as a highly secure server with an accurate tamperproof clock 11. A cryptographic device 13 is connected to the signature server 12 usually via a network. In-between might be an application server located (not shown) for forwarding of requests. The cryptographic device 13 comprises a computer device 14, which here is a client computer 14, a card or smart card reader 16, and a smart card 18 which operates together with the smart card reader 16 and the client computer 14.

For the understanding of the process flow, the steps are labeled at the connections with numbers in a circle which correspond to the numbers 1-8 mentioned hereafter. As indicated with 1, the electronic document to be signed is retrieved from the document repository 10 and presented to the signature server 12 where a system signature is created and attached. This is described in more detail with reference to FIG. 2. The electronic document and system signature are presented to the client computer 14, as indicated with 2. As indicated with 3, the user's client computer 14 presents the electronic document and system signature, or hash thereof, to the attached card reader 16. As indicated with 4, the card reader 16 presents the electronic document and system signature, or the hash thereof, to the smart card 18 inserted in to the card reader 16 that is a card reading device. As indicated with 5, the smart card 18 creates a user signature from the presented data which is returned to the smart card reader device 16. As indicated with 6, the smart card reader device 16 returns the user signature to the user's client computer 14. As shown with 7, the user's client computer 14 returns the electronic document, the system signature, and the user signature to the signature server 12 for verification purposes where also a third signature can be added. As indicated with 8, the verified electronic document, the system signature, and the user signature are saved in the document repository 10.

The system signature is created at the signature server 12 usually located at a central site. For the creation of the system signature two algorithms with public/private double-key based on a key size of, for example, 4096 bits, can be used. A respective private key can be stored in a hyper-secure cryptographic coprocessor card which generates a reference timestamp. A corresponding public key can be stored in the signature server 12 which can also be used as public keys server located at the central site.

The user signature is calculated and generated under use of a cryptographic token that here is the smart card 18. For that, an algorithm with public/private double-key based on a key size of, for example, 2048 bits can be used. The double-key is generated once by the user or a user group. A users private key is only stored in the electronic card, the smart card 18. It is not on transit on any network and it cannot be copied. A corresponding user public key can be stored in a public keys server located at the central site whereto it is transmitted by order.

In a further embodiment, the user asks for displaying one electronic document he/she wants to sign. Consequently, a request is sent to the application server or directly to the document repository 10 in order to obtain the data in question which has to be presented to the user for his/her signature. The set of data, that is the requested electronic document and the user's identity are sent to the signature server 12 in order to be signed. At this step, the system signature is added to the electronic document. The electronic document and system signature are then forwarded and presented to the user. The data can then be checked by the user.

In another embodiment, the user signs by placing his/her finger on a fingerprint reader which can be on the card reader 16.

The same reference numbers are used to denote the same or like parts.

Figure 2:
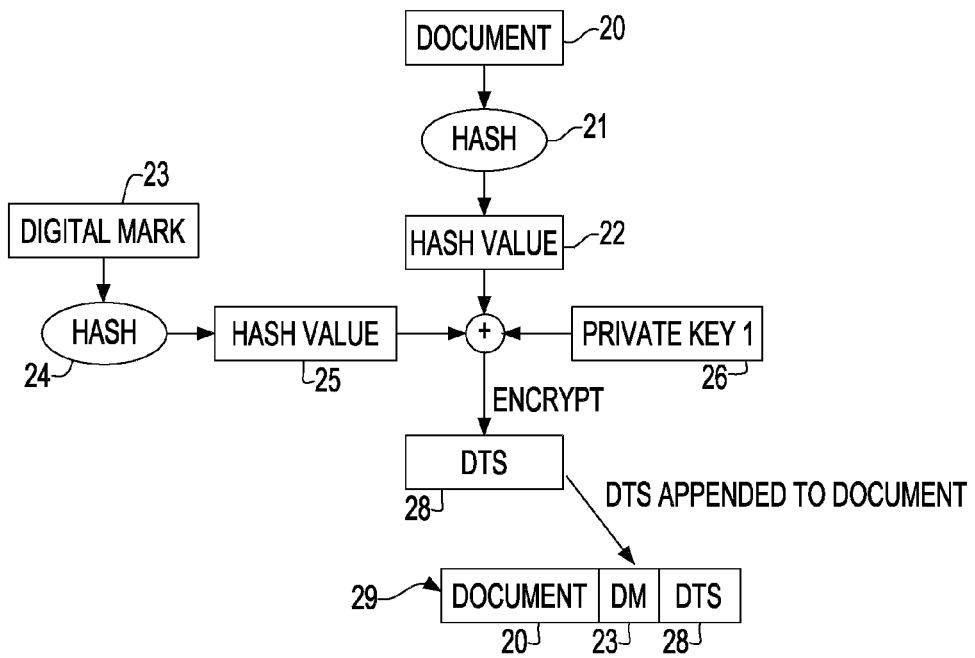
FIG. 2 shows a schematic illustration of the creation of a first digital signature

FIG. 2 shows a schematic illustration of the creation of a first digital signature 28, also referred to as digital timestamp signature and abbreviated to DTS, which is also called system signature with reference to FIG. 1. The electronic document is hereafter also referred to as document 20. In summary, the signature server 12 attaches a digital mark 23 (DM), comprising time and date and/or a sequence number, as well as the first digital signature 28 to the document 20 resulting in a digitally marked and signed electronic document 29. This first digital signature 28 signs the digital mark 23 and the document 20 in question or a hash thereof. In detail, from the document 20 a first hash 21 is generated resulting in a first hash value 22. Further, from the digital mark 23 a second hash 24 is generated resulting in a second hash value 25. Under use of the first and second hash value 22, 25, a first private key 26 that belongs to the signature server 12 and a cryptographic encryption algorithm the first digital signature 28 is created.

The long term security of the scheme relies on the security of the first digital signature 28. Performance is a minor issue here, as the system signature DTS is usually generated by a stationary server with sufficient resources. Therefore, the key length used here will be rather large, e.g., 4096 bit RSA, and possibly several different schemes basing on different cryptographic assumptions are used in parallel in case there is a total break of cryptographic algorithm, e.g., RSA and DSA.

Figure 3:
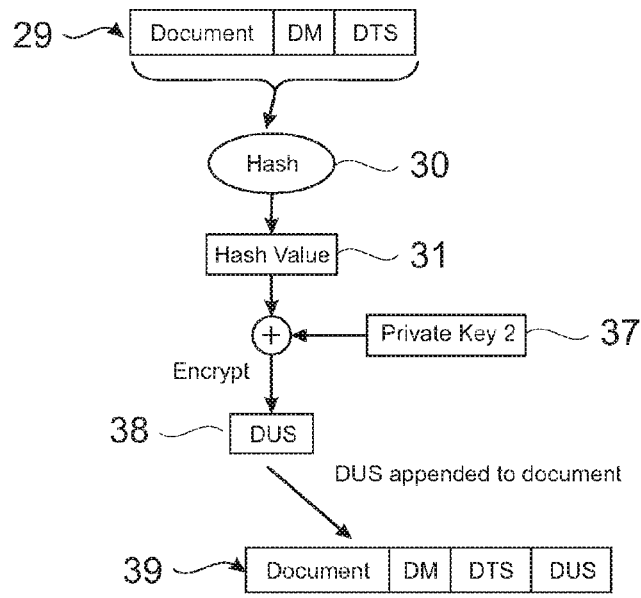
FIG. 3 shows a schematic illustration of the creation of a second digital signature

FIG. 3 shows a schematic illustration of the creation of a second digital signature 38. The second digital signature 38 is called user signature with reference to FIG. 1 and also abbreviated to DUS. To bind the signature to a particular user, the user signature, that is the second digital signature 38, is added to the digitally marked and signed electronic document 29 which was signed by the signature server 12. In detail, from the digitally marked and signed electronic document 29 a third hash 30 is generated resulting in a third hash value 31. Under use of the third hash value 31, a second private key 37 that belongs to the user, and a cryptographic encryption algorithm the second digital signature 38 is created. The second digital signature 38 is then added to the digitally marked and signed electronic document 29 resulting in a digitally signed electronic document 39 which is verifiable.

The second digital signature 38 is issued by a small cryptographic token being the smart card 18, in possession of the user. Therefore, the computing power may be limited. This imposes a restriction on the key length and thus also on the long-term security of the users signature. Furthermore, it is possible that the cryptographic token, i.e. the smart card 18, is lost or stolen. The token can thus not be used to ensure long-term security. Over the lifetime of the system, it can be replaced or retired at any time without endangering the security if signatures issued before or afterwards.

Figure 4:
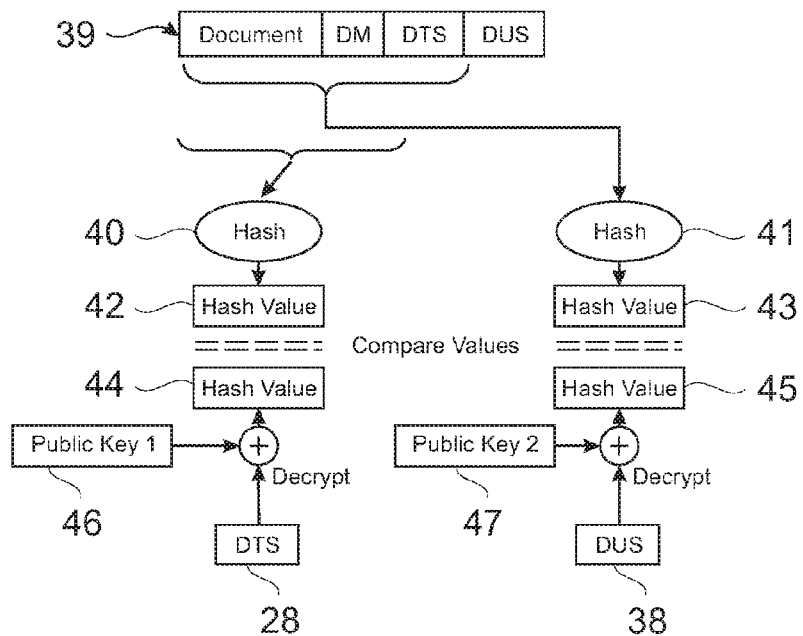
FIG. 4 shows a schematic illustration of a verification of the digital signature

FIG. 4 shows a schematic illustration of a verification of the digitally signed electronic document 39.

To verify the signature 28, 38, the user first verifies the second digital signature 38 by applying a second public key. The user also should verify whether or not the second public key 47 is valid for the time or sequence number contained in the digital mark 23. As the second private Key 37 may be revoked, the document signed with it after revocation is not valid.

If the second digital signature 38 is valid, the user verifies if the first digital signature 28 is correct by using a first public key 46, the key that corresponds to the first private key 26 used by the signature server 12. If both signatures DTS, DUS are correct and the second public key 47 is valid for the time in question, the whole signature is considered correct.

In detail, from the document 20, the digital mark 23, and the first digital signature 28 a first verification hash 41 is derived resulting in a first verification hash value 43. Furthermore, under use of the second public key 47, the second digital signature 38, and a cryptographic decryption algorithm a second verification hash value 45 is derived. The first and second verification hash values 43, 45 can then be compared easily.

From the document 20 and the digital mark 23 a second verification hash 40 is derived resulting in a third verification hash value 42. Further, under use of the first public key 46, the first digital signature 28, and a cryptographic decryption algorithm a fourth verification hash value 44 is derived. The third and fourth verification hash values 42, 44 can then be compared easily. If the hash values 43, 45 and 42, 44 match respectively, the signatures are valid.

Figure 5:
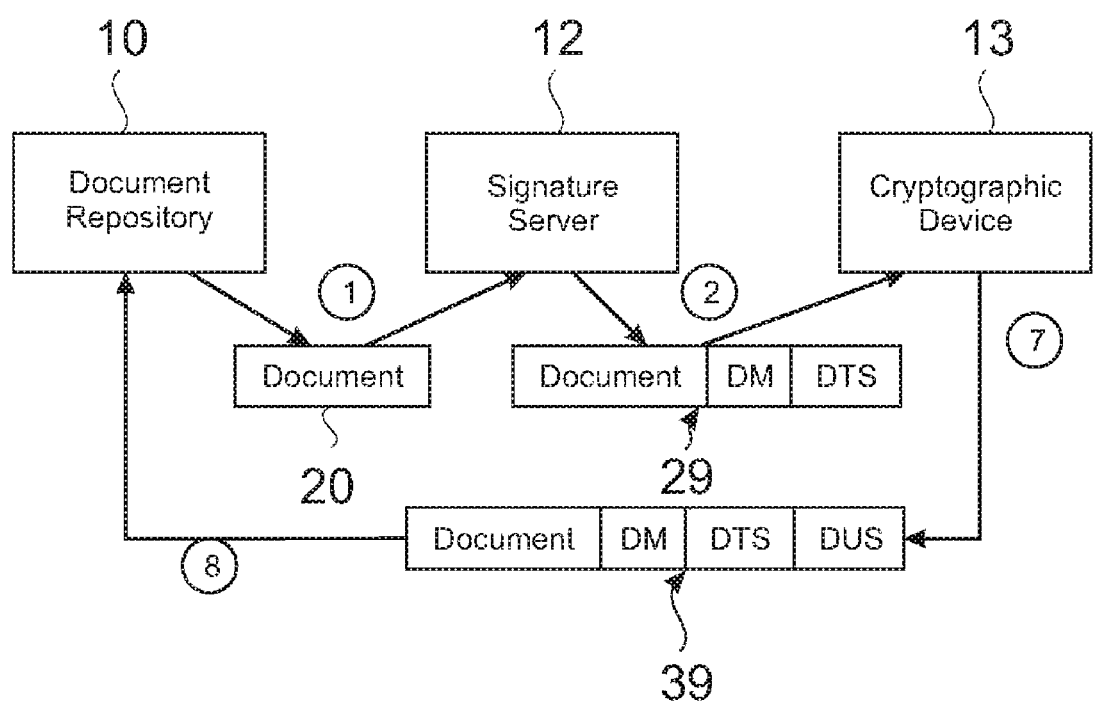
FIG. 5 shows a schematic illustration of a process flow for the creation of the digital signatures The drawings are provided for illustrative purpose only and do not necessarily represent practical examples of the present invention to scale.

FIG. 5 shows a schematic illustration of a process flow for the creation of the digital signatures DTS and DUS. With reference to FIG. 1, the target document 20 is retrieved from the document repository 10 and presented to signature server 12, as indicated with 1. The signature server 12 creates the first digital signature DTS and attaches it to the document 20 together with the digital mark DM. This results in the digitally marked and signed electronic document 29. This document 29, as indicated with 2, is then presented to the cryptographic device 13 which creates the user signature, i.e. the second digital signature DUS, and attaches it to the system signed document. The resulting digitally signed electronic document 39 is forward by the cryptographic device 13. Finally, as indicated with 7 and 8, the digitally signed electronic document 39 is verified and returned to the document repository 10.

Any disclosed embodiment may be combined with one or several of the other embodiments shown and/or described. This is also possible for one or more features of the embodiments.

The invention claimed is:

1. A method comprising:
digitally signing an electronic document for long term security purposes and user involvement, digitally signing comprising steps of:
at a signature server:
marking the electronic document with a digital mark forming a marked electronic document, wherein said digital mark is dependent upon content of said electronic document;
generating a first digital signature using the digital mark, using a plurality of different signature schemes in parallel;

signing the marked electronic document with a first digital signature forming a signed electronic document;

providing the marked electronic document and the first digital signature to a client computer to be verified;

signing a second digital signature employing a computer device, signed by a user of said computer device using a cryptographic token, said second digital signature being dependent on the content of the electronic document and the first digital signature that is less computationally intensive in its generation than the first digital signature;

wherein the second digital signature is based on a shorter cryptographic key than the first digital signature;

receiving the marked electronic document, the first digital signature, and the second digital signature from the client computer;

adding a third digital signature to generate a verified electronic document; and storing the verified electronic document in a repository.

2. The method according to claim 1, wherein the cryptographic token is related to at least one of an individual user and a user group.

3. The method according to claim 1, wherein the digital mark comprises a unique number that is at least one of a sequence number, a timestamp, and a value derived thereof.

4. The method according to claim 1, wherein the computer device comprises an electronic smart card reader reading a smart card.

5. A system for digitally signing an electronic document for long term security purposes, the system comprising:

a document repository for storing and providing the electronic document;

a digital signature computing device connected to the document repository for deriving from a digital mark and the electronic document a first digital signature using a plurality of different signature schemes in parallel, wherein said digital mark is dependent upon content of said electronic document; and a second digital signature computing device generating a second digital signature being signed by a user by using a cryptographic token, said second digital signature being less computationally intensive in its generation than the first digital signature, said second digital signature being dependent on the content of the electronic document and the first digital signature;

wherein the second digital signature is based on a shorter cryptographic key than the first digital signature.

6. The system according to claim 5, wherein the digital signature computing device comprises a tamperproof clock.

7. The system according to claim 5, wherein the second digital signature computing device comprises an internal clock verifying a predefined time-interval between the issuance of the first digital signature and the second digital signature.

8. The system according to claim 5, used for verifying the digital signed electronic document using a first public key corresponding to the first digital signature and a second public key corresponding to the second digital signature.

9. A method comprising verifying an electronic document that has been digitally signed by a first digital signature using a digital mark, and signed by a second digital signature forming a digitally signed electronic document, the step of verifying comprising the step of:

verifying, by a computing device, a validity of the digitally signed electronic document by using a first public key corresponding to the first digital signature and a second public key corresponding to the second digital signature, said second digital signature being less computationally intensive in its generation than the first digital signature;

wherein the first digital signature is generated using a plurality of different signature schemes in parallel;

wherein the second digital signature is signed by a user of the computing device using a cryptographic token;

wherein the second digital signature is generated to be dependent upon content of the electronic document and the first digital signature;

wherein the second digital signature is based on a shorter cryptographic key than the first digital signature.

\* \* \* \* \*